July 28, 1970  H. G. LANGHJELM ET AL  3,521,795

FULL DISCHARGE DISPENSING CONTAINER

Filed March 4, 1968  3 Sheets-Sheet 1

INVENTORS
HENRIK G. LANGHJELM
FINN BERGISHAGEN
KENNETH A. HUTCHINSON

BY Whittemore Hulbert &
Belknap ATTORNEYS

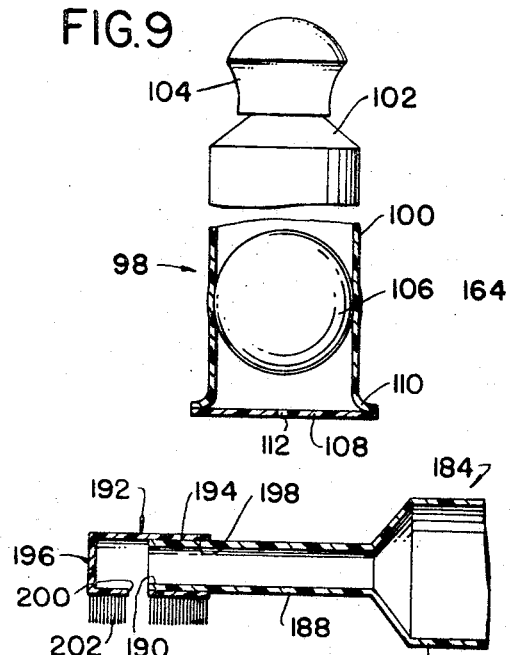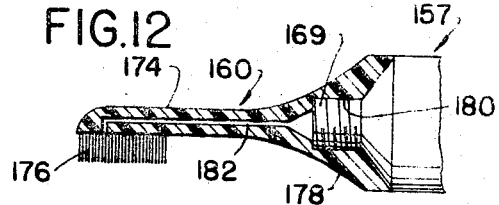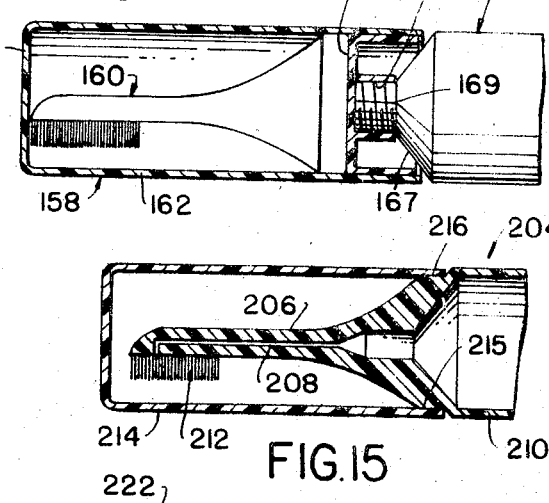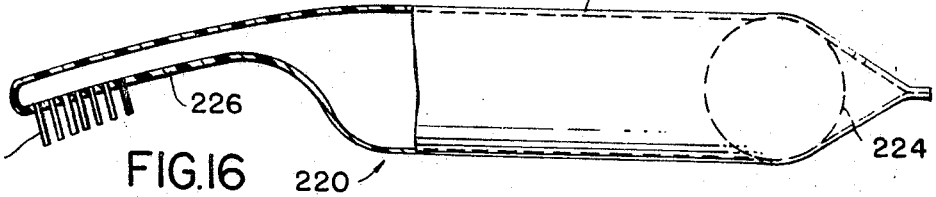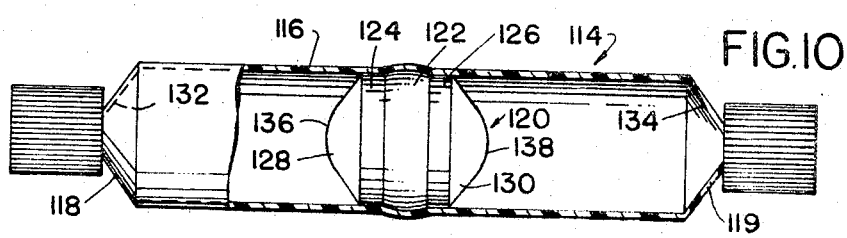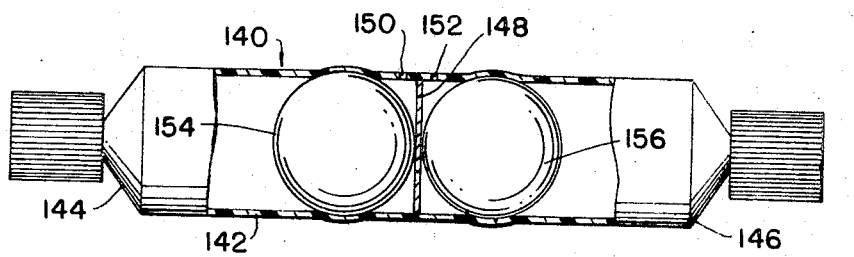

July 28, 1970     H. G. LANGHJELM ET AL     3,521,795
FULL DISCHARGE DISPENSING CONTAINER
Filed March 4, 1968                                  3 Sheets-Sheet 3
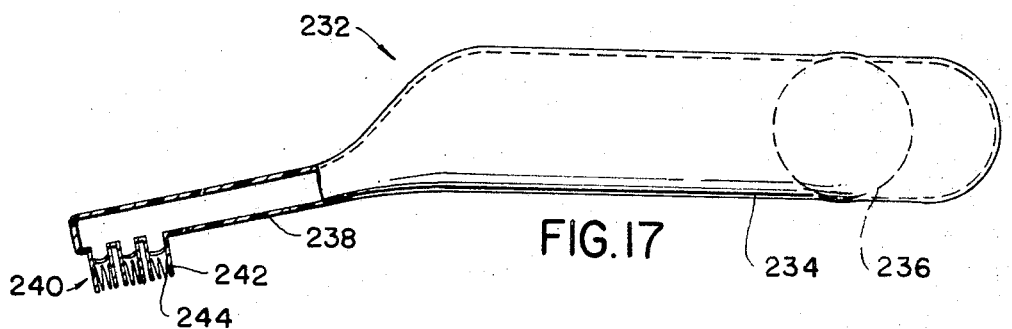
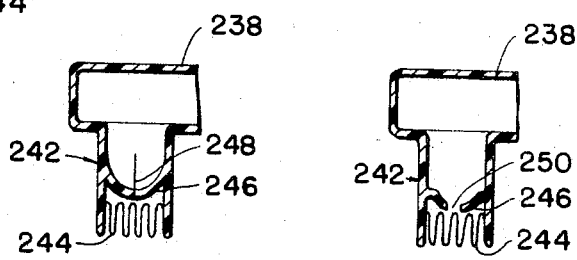 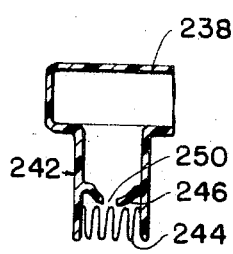
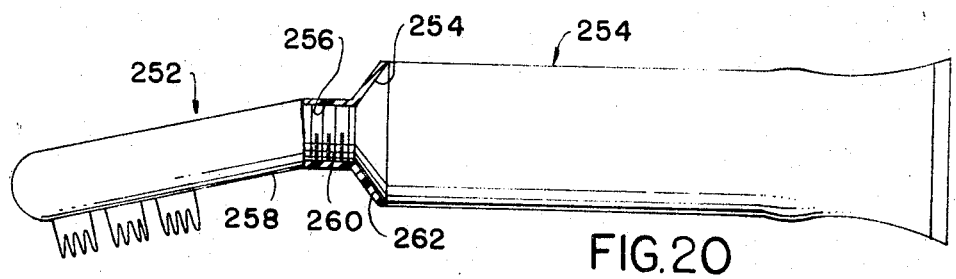
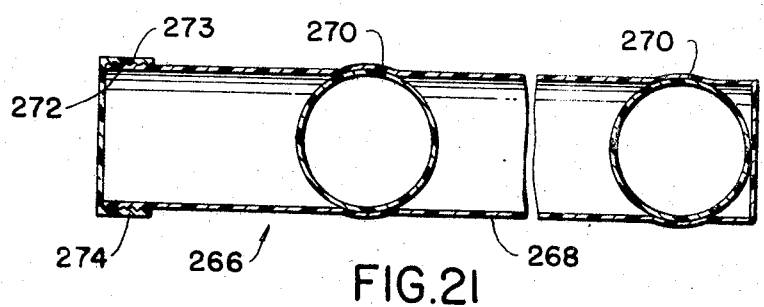
INVENTORS
HENRIK G. LANGHJELM
FINN BERGISHAGEN
KENNETH A. HUTCHINSON
BY *Whittemore, Hulbert & Belknap* ATTORNEYS United States Patent Office 3,521,795
Patented July 28, 1970

3,521,795
FULL DISCHARGE DISPENSING CONTAINER
Henrik G. Langhjelm, Southfield, Finn Bergishagen, Birmingham, and Kenneth A. Hutchinson, Livonia, Mich., assignors to Bahl Associates, Birmingham, Mich., a co-partnership
Filed Mar. 4, 1968, Ser. No. 710,169
Int. Cl. B67d 5/42
U.S. Cl. 222—386
11 Claims

ABSTRACT OF THE DISCLOSURE

A dispenser and method are provided for dispensing fluid materials, such as pastes and liquids, by displacement from a tubular body. The dispenser comprises a tubular body fabricated of a flexible plastic material. A dispensing opening is provided at one end and a plunger element is provided within the body. The plunger element preferably has a spherical portion which contacts the interior surface of the tubular body and is constructed as a rigid or semi-rigid element. The major diameter of the spherical portion is greater than the diameter of the tubular body. Consequently, the tubular body is stretched outwardly and is in sealing engagement with the plunger. The plunger is manipulated by external pressure applied to the tubular body. Movement of the plunger towards the dispensing opening causes fluid material to be dispensed out the opening. The plunger is self-lubricating, the spherical nature thereof resulting in sufficient pivoting so that surfaces of the plunger and the walls of the tube are coated with the fluid material which acts as a lubricant.

BACKGROUND OF THE INVENTION

Conventionally, dispensers of the type contemplated by the present invention have been fabricated of metal. Examples are toothpaste dispensers, hand lotion dispensers, and hair preparation dispensers. One disadvantage of metal dispensers is that the dispenser body collapses and wrinkles after the product is dispensed. This creates a visually objectionable dispenser. Additionally, product identity is lost, that is, the brand name and advertising indicia are unreadable when the dispenser is collapsed.

The present invention provides a plastic tube in place of the usual metal tube. The plastic tube is flexible and thus does not wrinkle or crumple in the same fashion as a metal tube. A plunger element is provided within the tube to enable the consumer to squeeze substantially all of the product out of the tube. The plunger element may be of a spherical ball which is in fluid-type engagement with the interior surface of the tube. The plunger causes the entire contents of the tube to be dispensed even if there is air trapped within the tube.

The product is dispensed by squeezing the tube and forcing the plunger element toward the dispensing nozzle. Instead of rolling the tube up as is the case with a metal tube, the plunger element is rolled or squeezed on its rear side toward the dispensing nozzle. After the plunger is moved toward the nozzle, air is allowed to enter the tube through a vent opening provided in the tube rearwardly of the plunger. The entering air replaces the material which has been dispensed. As a consequence, the tube retains its original shape and thus maintains product identity in that the advertising indicia on the tube is always clearly readable.

One of the main features of this invention is not only the improvement over metal tubes, but more important, the improvement over conventional plastic tubes. Existing plastic tubes present a difficult problem in dispensing all the product from the tube. This cannot be done in a normal manner and has been the subject of many complaints. This is because of the internal volume of the plastic tube remaining constant after a portion of the contents has been dispensed. This results in the introduction of air as a replacement of the material dispensed. As the contents are dispensed, the ratio of air to product becomes increasingly greater within the fixed volume of the tube. As a consequence, upon squeezing the tube, the less dense fluid, air, is preferentially dispensed. Upon releasing the tube, the tube returns to its original internal volume allowing re-entry of air. A critical point is reached in the ratio of air to product, at which time it becomes impossible to dispense the product in a normal manner. This leads to excessive waste and customer dissatisfaction. The present invention eliminates the above-mentioned disadvantages, because, as the plunger advances, the internal volume of the tube decreases, thereby maintaining a favorable low ratio of air to product and thus allowing it to be easily dispensed. One important feature of the spherical plunger is that it allows complete removal of the tube contents which is not possible with currently used flexible tubes.

The dispensing device is adaptable for use in connection with a toothbrush element. The toothbrush element may be formed integrally with the dispenser or may be an internally threaded member securable to the externally threaded nozzle of the dispenser.

SUMMARY OF THE INVENTION

The dispenser for fluids comprises an elongated tubular body which is fabricated of a flexible plastic material. A dispensing nozzle is provided at one end of the tubular body. A plunger element is provided within the tubular body. The plunger element has at least one annular curved portion in contact with the interior surface of the tubular body. The diameter of the curved portion is greater than the diameter of the tubular body. This difference in diameter causes the tubular body to be stretched outwardly in sealing engagement with the plunger element. The plunger element, upon external manipulation of the tubular body, is movable towards the nozzle to cause ejection of fluid material out of the nozzle.

BRIEF DESCRIPTION OF THE DRAWINGS

FIG. 9 is a view of a further embodiment of the invention illustrating a dispenser in the upstanding position with the lower portion thereof in section for the purpose of clarity;

FIG. 10 is a view with portions in section illustrating a two-component dispenser;

FIG. 11 is a view with portions in section of another embodiment of a two-component dispenser;

FIG. 12 is a view of the forward end of a dispenser of the present invention with a toothbrush attachment secured thereto;

FIG. 13 is a view of the FIG. 12 embodiment illustrating a storage cap mounted on the dispenser and with the toothbrush of FIG. 12 stored therein;

FIG. 14 is a view of the forward end of a dispenser illustrating another embodiment of a toothbrush attachment;

FIG. 15 is a view of the forward end of a dispenser illustrating a further toothbrush embodiment;

FIG. 16 is a side elevational view of yet another embodiment of the dispenser of the present invention illustrating yet another toothbrush modification;

FIG. 17 is a side elevational view, with portions broken away for the purpose of clarity, of another embodiment of the dispenser of the present invention illustrating a toothbrush modification wherein the bristles are constituted by jagged edges of short plastic tubes which are formed on one end of a dispensing nozzle;

FIG. 18 is a view in section of one of the tubular bristle members of FIG. 17 illustrating the self-closing dispensing opening thereof in the closed position;

FIG. 19 is a view similar to FIG. 18 illustrating the dispensing opening in the discharging position;

FIG. 20 is a side elevational view of an embodiment similar to FIG. 17 modified by the provision of a removable toothbrush attachment; and FIG. 21 is a side elevational view in section of another embodiment of the dispenser of the present invention wherein a plurality of plungers are provided within the dispenser for dispensing a metered amount of the dispenser contents.

FIGS. 1–3 illustrate the basic design of the dispenser structure 10 of the present invention. The dispenser 10 comprises a flexible tube 12 preferably fabricated of a plastic material. The tube 12 includes a main cylindrical body portion 14 having a flared rearward end 15. The marginal edge portion 16 is sealed, as by heat sealing, as is conventional. A vent opening 18 is provided for the ingress of air as material is dispensed from the dispenser.

The forward end 20 is tapered radially inwardly and merges with a neck portion 22. The neck portion 22 is externally threaded at 24 to receive an internally threaded cap 26.

Figure 1:
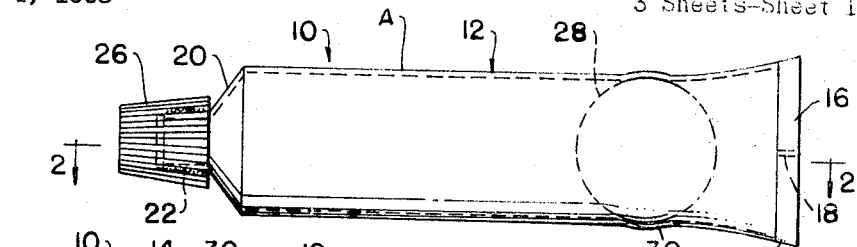
FIG. 1 is a top plan view of one embodiment of the dispenser of the present invention.
Figure 2:
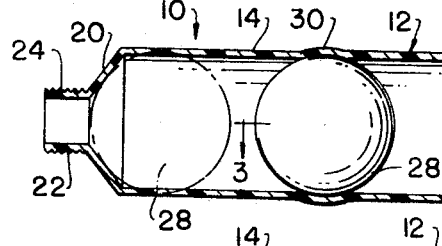
FIG. 2 is a view in section of the dispenser of FIG. 1 taken substantially along the line 2—2 of FIG. 1 looking in the direction of the arrows illustrating dispensing of material from the device.

A spherical plastic ball member 28 is received within the tube 12. The flared rearward end 15 of the dispenser permits ready insertion of the ball element 28. The ball element 28 is positioned within the tube 12 prior to heat sealing of the marginal edge portion 16. It will be noted that the major diameter of the ball element 28 is greater than the internal diameter of the tube 12 with the result that the portion 30 of the tube 12 in contact with the ball element 28 is stretched radially outwardly. This arrangement provides a fluid-tight seal between the ball element 28 and the tube 12 to prevent the passage of material contained in the dispenser past the ball element towards the rearward end 15 of the dispenser. As shown in FIGS. 1 and 2, the ball element 28 functions as a plunger and is moved forwardly within the dispenser to cause ejection of material through the neck portion 22. The dotted-line position of the ball element 28 in FIG. 1 illustrates the initial position of the ball, the solid-line position of the ball in FIG. 2 indicates that about one-half of the dispenser contents has been dispensed, while the dotted-line position of the ball in FIG. 2 illustrates complete ejection of all the material from the dispenser. It will be appreciated that substantially all of the material is ejected or displaced from the dispenser when the ball element assumes the dotted-line position of FIG. 2.

The material contained within the dispenser 10 may be any of a variety of liquid or paste materials, such as toothpaste, hand lotion, hair preparations and the like.

The piston or plunger-like action of the ball element 28 assures complete dispensing of material. Further, the vent opening 18, which is located behind the ball element 28, permits air to enter the dispenser to replace the material which is dispensed therefrom. The tube thus maintains its original cylindrical shape as material is dispensed. It does not collapse behind the ball element 28. This arrangement is important from the standpoint of product identity. The brand or trademark and other advertising material appearing on the exterior surface of the tube 12 is always readable during the useful life of the dispenser.

Figure 3:
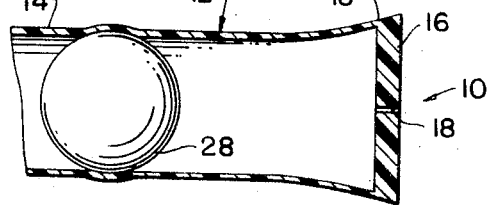
FIG. 3 is a view in section taken substantially along the line 3—3 of FIG. 2 looking in the direction of the arrows.
Figure 4:
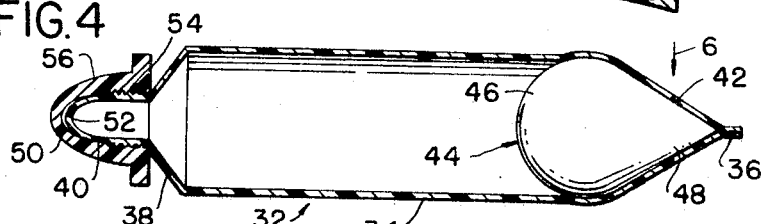
FIG. 4 is a side elevational view in section of another embodiment of the invention.
Figure 5:
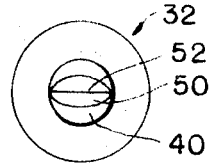
FIG. 5 is an end view of the embodiment of FIG. 4 shown with the cap removed.
Figure 6:
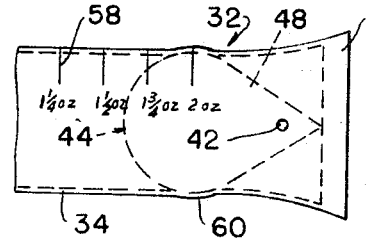
FIG. 6 is a view of the rearward end of the dispenser of FIG. 4 looking in the direction of the arrows.

FIGS. 4, 5 and 6 illustrate another embodiment of the invention. The dispenser 32 again comprises a cylindrical flexible elastomeric tube 34 which, at the rearward end, is sealed along the marginal edge portion 36. The forward end of the tube is tapered radially inwardly at 38 and merges with an externally threaded neck portion 40. A vent opening 42 is provided in the rearward end of the tube 34 for the purpose described in connection with the FIGS. 1–3 embodiment.

As shown in FIGS. 4 and 6, the plunger element 44 has a teardrop shape. The forward or dispensing portion 46 is a section of a sphere having a major diameter larger than the diameter of the tube 34 to result in the desired sealing and dispensing action. However, the rearward portion 48 has a conical shape. This permits improved leverage for easy dispensing of material.

As best illustrated in FIGS. 4 and 5, the forward end portion 50 of the neck 40 has an oval shape and has a slit 52. The slit 52, as a result of the elastomeric nature of the material from which the tube is fabricated, is normally self-closing. However, when pressure is applied to the interior of the tube as a result of manual displacement of the plunger element 44, the forward portion 50 of the tube is caused to separate in the area of the slit 52 to thus provide an opening for the expulsion of material. When the pressure is relieved, the slit closes. This arrangement is desirable from the standpoint that the interior of the tube is isolated from the ambient atmosphere. This prevents hardening or evaporation of the contents of the dispenser. Additionally, the self-closing feature permits accurate control of the amount of material dispensed, prevents water from being sucked inside with the result that the unit may be used to dispense soap in a bathtub, and prevents air from being sucked in even when the tube is squeezed in front of the ball, entrapped air being undesirable because it causes large globules to be accidentally dispensed.

The neck 40 is externally threaded at 54 and receives an internally threaded cap 56. The cap 56 acts as a second seal for the dispenser. Additionally, the cap prevents inadvertent dispensing of the tube contents. It will be appreciated, however, that in the event the cap is not threaded onto the neck after a dispensing operation, the nature of the self-closing slit 52 still guards the dispenser contents from contact with the ambient atmosphere.

FIG. 6 illustrates another feature of the invention. It will be noted in FIG. 6 that indicia marks 58 are placed on the exterior surface of the tube 34. These marks indicate the contents of the tube which remain after a dispensing action. The amount of the contents may be observed visually in the event the tube 34 is fabricated of a transparent material. In the event the material is opaque, the bulging portion 60 will indicate the amount remaining in the dispenser. The indicia marks 58 may be used to dispense a measured amount of material. The user merely has to note the start and finish positions of the plunger 44 in order to determine the amount of material dispensed.

Figure 7:
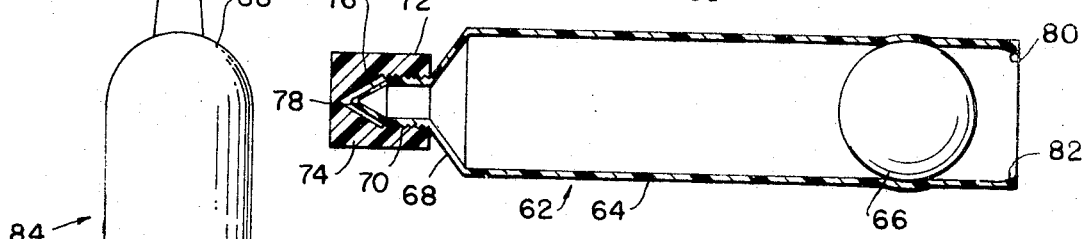
FIG. 7 is a view in section of another embodiment of the invention.

FIG. 7 discloses an open-ended dispenser 62. This dispenser 62 is primarily designed to dispense relatively viscous materials such as grease, calking compounds, cake frostings and the like. The dispenser 62 may be used in place of a gun-type dispenser for these materials.

The dispenser 62 comprises an elongated flexible tubular portion 64 which receives a dispensing ball 66 as in the FIG. 1 embodiment. The forward end 68 of the tubular portion 64 is tapered radially inwardly and merges with a neck portion 70. The neck portion 70 is externally threaded at 72 to receive an internally threaded cap 74. The neck 70 has a conically shaped dispensing nozzle 76 which has a dispensing opening 78. The shape of the nozzle 76 permits directing a stream of material from the dispenser with relatively accurate control.

It will be noted that the rearward end 80 of the tubular portion 64 is open. Further, the rearward end 80 is circular. This permits removal of the ball 66 and reloading of the dispenser. The inner circumference 82 of the end 80 is enlarged radially inwardly. This prevents inadvertent escape of the ball member 66.

Figure 8:
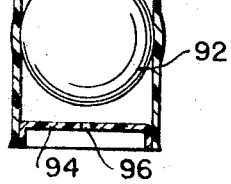
FIG. 8 is a view of another embodiment of the invention with the dispenser illustrated in an upstanding position and with the upper and lower portions thereof in section for the purpose of clarity.

FIG 8 illustrates an embodiment of a dispenser 84 which may be stood on end for display purposes. The dispenser 84 comprises an elongated tubular member 86 which terminates at the dispensing end 88 in a spherical configuration. An elongated conically shaped dispensing nozzle 90 is provided on the dispensing end. The usual ball-type dispensing element 92 is provided within the tubular portion 86. The opposite end of the tubular portion 86 is closed by means of a cup-shaped element 94 which has a vent opening 96. The cup-shaped element 94 may be secured in place as by heat sealing.

It is desirable, in some instances, to place the dispenser in an upright position for purposes of retail display. For example, certain products, such as mustard, catsup, glue and the like, are normally marketed in glass bottles. Such bottles are set on shelves in the upright position. Therefore, to conform with the standard retail practice, it is desired that the dispenser also be capable of standing on end.

FIG. 9 illustrates a dispenser 98 similar in function to the dispenser illustrated in FIG. 8 in that it may be stood on end for display purposes. The dispenser 98 comprises a cylindrical tubular portion 100 which merges with a radially inwardly extending dispensing end 102. A cap 104 is provided to normally close the dispensing opening. The usual ball element 106 is provided within the tubular portion 100 for dispensing purposes. The opposite end of the dispenser is closed by means of a disk-shaped element 108. The end portion 110 is flared radially outwardly for attachment of the disk element 108. The disk element 108 has a vent opening 112. The enlarged end portion 110 provides a stable base for standing the dispenser on end.

FIGS. 10 and 11 illustrate dispensers having dispensing nozzles at each end to permit dispensing of two different materials from the same dispenser. The dispensing of two different materials may be desired, for example, in the case of certain two-component adhesives such as the epoxies.

Referring to FIG. 10, the dispenser 114 comprises an elongated flexible tubular portion 16, which terminates at each end in a dispensing nozzle 118, 119. A piston-like dispensing member 120 is provided within the tubular portion 116. The member 120 comprises a central curved portion 122 which engages the side walls of the tubular portion 116 in a tight fit as previously described in connection with FIG. 1. A cylindrical portion 124, 126 is provided on either side of the curved portion 122. The cylindrical portions 124, 126 have diameters substantially equal to the inner diameter of the tubular portion 116. These cylindrical portions 124, 126 prevent rotation of the member 120 within the dispenser. Thus, the portions of the member 120 which are in contact with one of the materials within the dispenser cannot be placed in contact with the other of the materials. The cylindrical portions 124, 126 merge with radially inwardly extending conical sections 128, 130. These sections mate with the radially inwardly extending conical end portions 132, 134 at the ends of the dispenser to permit complete dispensing of the material from the dispenser. The portions 128, 130 merge into spherical portions 136, 138 to complete the structure.

FIG. 11 illustrates an alternate method for providing a dispenser capable of utilization in connection with two different materials. In FIG. 11, the dispenser 140 comprises an elongated tubular portion 142 which terminates in a dispensing nozzle 144, 146 at each end thereof. A central divider 148 is provided internally of the tubular portion 142 to completely isolate the contents of the dispenser. A pair of vent openings 150, 152 are provided, each adjacent one side of the divider 148. The structure is completed by the provision of a pair of ball elements 154, 156, one being provided on each side of the divider 148. It will be appreciated that the material on either side of the divider 148 may be dispensed by manipulation of the proper ball member.

FIGS. 12–16 illustrate a modification of the basic dispenser structures for use as toothpaste dispensers. Referring first to FIGS. 12 and 13, it will be noted that a basic dispenser structure 157, such as the dispenser 10 illustrated in FIG. 1, is provided.

A cup-shaped cap member 166 is provided to seal the dispenser nozzle 167 and to receive a tubular storage member 158. The cap member 166 has an internally threaded socket 170 which is threadingly received on the threaded neck 169 of the dispenser nozzle 167. The member 158 acts as a storage container for a toothbrush member 160. The member 158 comprises an elongated tubular portion 162 which is closed at one end by wall 164 and open at the other end for frictional reception on the cap 166.

The toothbrush 160 comprises an elongated portion 174 which has, at its outer end, bristles 176 for cleaning of the teeth. The opposite end 178 is outwardly flared and has a central threaded opening 180 for reception on the neck 169 as illustrated in FIG. 12. A passageway 182 leads from the opening 180 into communication with the bristles 176. It will be appreciated that toothpaste which is dispensed from the dispenser 157 is forced through the passageway 182 into the bristles 176 whereupon the toothpaste is available for cleaning of the teeth.

In operation of the device, the member 158 is pulled off the cap 166 and the cap 166 is unthreaded from the dispenser 157. The toothbrush element 160 is then threaded onto the neck 169 whereupon the device is ready for use. The toothpaste dispenser has several desirable features. It makes an ideal promotional item for toothpaste products, encourages more frequent brushing of teeth as a result of its convenience, and incorporates the advantages of the dispenser structure of the invention.

FIG. 14 illustrates another embodiment of a toothbrush dispenser 184. The dispenser 184 comprises a tubular body portion 186 having therein a ball-type dispenser member as previously described. A tubular neck or nozzle 188 of reduced diameter extends from the dispensing end of the tubular member 186. The neck 188 terminates in an open end 190. A cap element 192 is frictionally received on the end of the neck 188. The cap element 192 comprises a tubular body portion 194 closed at one end by a wall 196 and open at the other end 198. An opening 200 is provided centrally in the body portion 194. Bristles 202 are provided exteriorly of the body portion 194 adjacent the area of the opening 200.

When the device is to be used as a toothbrush, the cap 192 is pulled outwardly to the position shown in FIG. 14 where the opening 200 is just forward of the end of the neck 188. Toothpaste may then be dispensed from the dispenser through the neck 188 and out the opening 200 onto the bristles 202. After the tooth-cleaning operation has been completed, the cap 192 is pushed fully onto the neck 188 whereupon the opening 200 no longer communicates with the open end 190 of the neck 188. Thus, toothpaste can no longer be dispensed from the device and the interior contents are protected from the ambient atmosphere.

FIG. 15 illustrates an embodiment of a dispenser 204 which is similar to that of FIGS. 12 and 13 excepting that the toothbrush element is integral with the dispenser. As shown in FIG. 15, the tubular dispenser body 210 terminates in an elongated neck 206 having a central passageway 208 which communicates with the interior of the tubular body 210. Bristles 212 are provided on the forward end of the outlet member 206 around the terminus of the passageway 208 in a manner similar to that described in connection with FIGS. 12 and 13. An annular recess 216 is provided on the exterior of the tubular body 210. A tubular cap member 214 having an open end 215 is received on the dispenser in the recess 216 whereupon the cap and tubular portion form a continuous surface. In the FIG. 15 embodiment, the entire dispenser is discarded after the contents thereof have been used. Contrariwise, in the embodiment in FIGS. 12 and 13, the toothbrush element and its tubular storage container may be reused.

FIG. 16 illustrates a toothbrush dispenser 220 which in many respects is similar to that of FIG. 15. The dispenser 220 comprises an elongated tubular body portion 222 having a ball element 224 therein as has been previously described. An elongated tubular neck portion 226 of reduced diameter extends from the forward end of the tubular body 222. Bristles 228 are formed on the end of the member 226. The bristles 228 are molded integrally with the dispenser, each bristle being hollow for ejection of toothpaste material therethrough. As an alternative to the hollow bristles 228, openings for dispensing toothpaste may be provided between the bristles 228. The embodiment illustrated in FIG. 16 is particularly adapted for low-cost production. The dispenser structure may be manufactured in various sizes such as for a one-time use or it may have several days' supply of toothpaste therein. It is inexpensive enough to be sold from a vending machine such as is present in transportation terminals and the like.

FIGS. 17, 18 and 19 illustrate a toothbrush dispenser 232 somewhat similar to the FIG. 16 embodiment. The dispenser 232 comprises an elongated tubular flexible plastic body portion 234 having a ball element 236 therein, as has been previously described. An elongated tubular neck portion 238 of reduced diameter extends from the forward end of the tubular body 234, and a bristle structure 240 is provided on the forward end of the neck 238. The bristle structure 240 comprises a plurality of tubular portions 242 which are molded integrally with the neck 238. They extend for a short distance right-angularly from the neck and terminate in a serrated edge which defines a plurality of spaced-apart bristle-like elements 244. It will be appreciated that the tubular portions 242 need not be formed integrally with the neck 238 but may be formed separately and mounted in place. This may be desirable to provide the portions 242 in a plastic material which is softer than the main body portion 234.

FIGS. 18 and 19 illustrate a means for opening and closing the tubular portion 242. A curved wall portion 246 extends across the interior of the tubular portion 242 immediately adjacent to the bristle-like elements 244; and a slit 248 is provided in the wall 246. When fluid pressure is applied to the interior surface of the walls 246, the wall separates along the slit 248 to form an opening 250, as shown in FIG. 19, for the ejection of toothpaste. When the pressure is relieved, the wall 246, as a result of the elasticity of the plastic material from which it is fabricated, returns to the initial position shown in FIG. 18 to close the opening. The toothbrush may then be rinsed clean and stored in the usual manner.

The embodiment illustrated in FIG. 20 is in most respects similar to that of FIGS. 17–19. However, in FIG. 20, the toothbrush attachment 252 of the dispenser 254 is removable in order to provide for storage thereof when the dispenser is not in use, with the dispenser per se then being tightly capped. As will be noted, the toothbrush attachment 252 has a threaded opening 256 at the base of the neck portion 258. The dispenser 254 has a threaded nozzle 260 which is threadingly received in the opening 256. A conical portion 262 extends from the neck portion 258 into sealing engagement with the end 254 of the dispenser. A conventional cap may be provided for closing of the nozzle 260 when the dispenser is not in use. Alternately, a storage container and cap structure as illustrated in FIGS. 12 and 13 may be employed.

The dispenser 266 illustrated in FIG. 21 provides a method of dispensing in which metered amounts of the contents of the dispenser may be dispensed without taking separate measurements. The dispenser 266 comprises an elongated tubular body 268 fabricated of a flexible plastic material. The tubular body 268 may be provided in any length desired, from a relatively short length to a relatively long tube having a length of several feet.

A plurality of hollow ball members 270 are provided within the tubular body 268, being spaced apart a predetermined distance by the material contained within the dispenser. The dispensing opening 272 has the same diameter as the diameter of the tubular body 268, to the end that the ball members 270 may be ejected from the dispenser after the material forwardly thereof has been dispensed. The forward end of the tubular body 268 is externally threaded at 273 to receive an internally threaded cap 274.

As will be appreciated, as the forwardmost ball member 270 is moved towards the dispensing opening 272, the material in front of the ball member is dispensed. This material is of a known amount. After the material before a ball member has been dispensed, the ball member itself is forced out of the dispenser. This leaves a predetermined amount of material behind the ball member and before the next succeeding ball member for a repetition of the dispensing process.

The ball members 270 may be constituted as hollow elements, which may be filled with a material used in connection with the main body of material dispensed, as, for example, in a two-component epoxy resin system. After a ball member 270 has been forced out of the tubular body 263, it is punctured and the material therein is forced from the interior by squeezing. The material within the ball member 270 is mixed with the material which has been dispensed in front of the ball member to complete the composition.

What we claim as our invention is:

1. A dispenser for fluids comprising an elongated tubular body fabricated of a flexible plastic material, a dispensing nozzle at one end of the tubular body, and a plunger element within the tubular body, said plunger element having at least one annular curved portion in contact with the interior surface of the tubular body, the diameter of said curved portion being greater than the diameter of the tubular body whereby the tubular body is stretched outwardly in sealing engagement with the plunger element, said plunger, upon external manipulation of the tubular body, being movable towards said nozzle to cause ejection of fluid material out of the nozzle, said tubular body having a nozzle at each end and being adapted to receive a different fluid material on each side of the plunger element whereby movement of the plunger element toward one of the nozzles results in dispensing one material and movement of the plunger element toward the other nozzle results in dispensing of the other material.

2. A dispenser as defined in claim 1 and further characterized in that said plunger element comprises a central curved portion which engages the side walls of the tubular body, and a cylindrical portion on each side of the curved portion to prevent rotation of the plunger element.

3. A dispenser as defined in claim 1 and further characterized in that said plunger element comprises a pair of movable members, each movable member being for the dispensing of one of the fluid materials.

4. A dispenser for fluids comprising an elongated tubular body fabricated of a flexible palstic material, a dispensing nozzle at one end of the tubular body, a plunger element within the tubular body, said plunger element having at least one annular curved portion in contact with the interior surface of the tubular body, the diameter of said curved portion being greater than the diameter of the tubular body whereby the tubular body is stretched outwardly in sealing engagement with the plunger element, said plunger, upon external manipulation of the tubular body, being movable towards said nozzle to cause ejection of fluid material out of the nozzle, and a toothbrush element on the nozzle, said toothbrush element comprising an elongated body having a central passageway in communication with the nozzle for passage of the contents of the dispenser, and bristles on the exterior of the elongated body of the toothbrush element to receive toothpaste material via the passageway for brushing of the teeth, said toothbrush element further comprising a tubular cap slidably receivable on said nozzle, said toothbrush element having an opening intermediate the ends thereof, movement of the toothbrush element in one direction causing the opening to be in communication with the outlet of the nozzle and movement of the toothbrush element in the other direction closing said communication.

5. A dispenser for fluids comprising an elongated tubular body fabricated of a flexible plastic material, a dispensing nozzle at one end of the tubular body, a plunger element within the tubular body, said plunger element having at least one annular curved portion in contact with the interior surface of the tubular body, the diameter of said curved portion being greater than the diameter of the tubular body whereby the tubular body is stretched outwardly in sealing engagement with the plunger element, said plunger, upon external manipulation of the tubular body, being movable towards said nozzle to cause ejection of fluid material out of the nozzle, and a toothbrush element on the nozzle, said toothbrush element comprising an elongated body having a central passageway in communication with the nozzle for passage of the contents of the dispenser, and bristles on the exterior of the elongated body of the toothbrush element to receive toothpaste material via the passageway for brushing of the teeth, said bristles comprising a plurality of tubular elements, the outer end of each tubular element being serrated to form bristle-like elements.

6. A dispenser as defined in claim 5 and further characterized in that said tubular elements are in fluid communication with said central passageway for the passage of toothpaste material therethrough.

7. A dispenser as defined in claim 6 and further characterized in the provision of a wall member in each of said tubular elements, said wall members each having a slit therein which, upon application of pressure to the tubular body and the contents thereof, spreads to define an opening for ejection of fluid material and which, upon release of said pressure, is self-closing.

8. A dispenser as defined in claim 5 and further characterized in that said tubular elements are formed integrally with said elongated body.

9. A dispenser as defined in claim 5 and further characterized in that said toothbrush element has a threaded opening at one end, said nozzle being externally threaded whereby the toothbrush element is engageable with the nozzle for use of the device as a toothbrush and is disengageable with the nozzle for storage purposes.

10. A dispenser for fluids comprising an elongated tubular body fabricated of a flexible plastic material, a dispensing nozzle at one end of the tubular body, and a plunger element within the tubular body, said plunger element having at least one annular curved portion in contact with the interior surface of the tubular body, the diameter of said curved portion being greater than the diameter of the tubular body whereby the tubular body is stretched outwardly in sealing engagement with the plunger element, said plunger, upon external manipulation of the tubular body, being movable towards said nozzle to cause ejection of fluid material out of the nozzle, said plunger element comprising a plurality of movable members, said movable members being spaced apart from each other a predetermined distance, whereby a metered amount of material is provided between said movable members, said dispensing nozzle having a diameter great enough to permit ejection of each movable member after the fluid material forwardly thereof has been dispensed.

11. A dispenser as defined in claim 10 and further characterized in that each of said movable members is hollow for containing fluid material of a different type than that contained within the main dispenser, said movable members being puncturable after ejection thereof from the dispenser for dispensing of the material contained therewithin.

References Cited

UNITED STATES PATENTS

| | | | |
|---|---|---|---|
| 1,236,232 | 8/1917 | Thompson | 222—386 |
| 2,695,735 | 11/1954 | Van Doornik | 222—386 |
| 2,743,042 | 4/1956 | Burgin | 222—207 X |
| 2,802,604 | 8/1957 | Ebberts | 222—207 |
| 2,880,913 | 4/1959 | Peyron | 222—386 X |
| 2,897,826 | 8/1959 | Di Vito | 222—207 X |

FOREIGN PATENTS

| | | |
|---|---|---|
| 1,070,728 | 2/1954 | France. |

SAMUEL F. COLEMAN, Primary Examiner

U.S. Cl. X.R.

222—522